Figure 14:
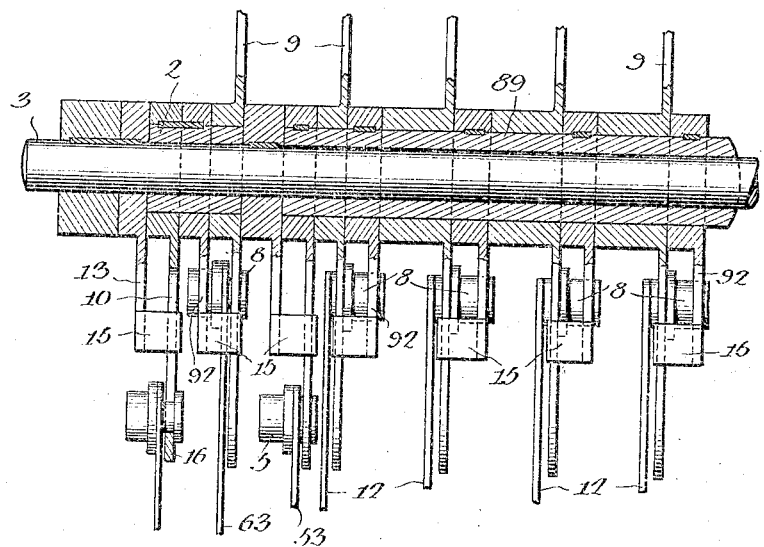

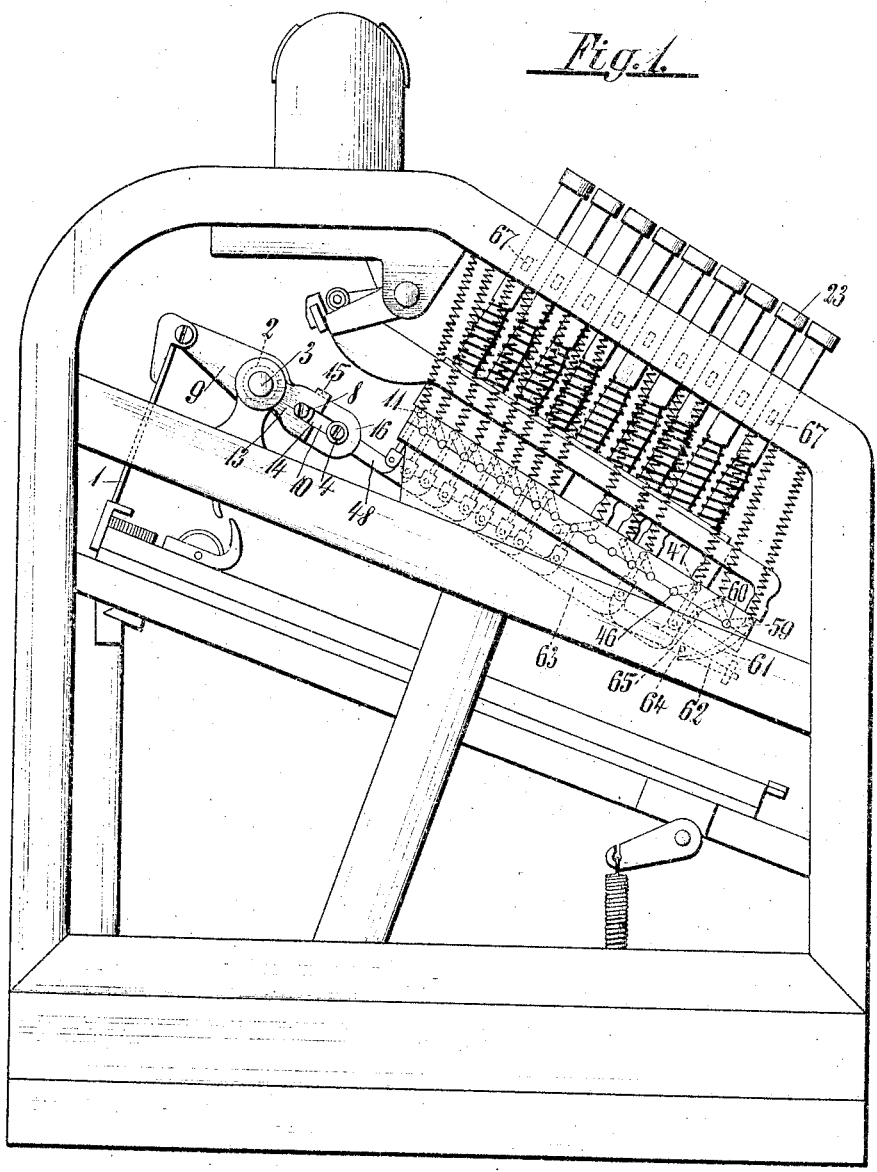

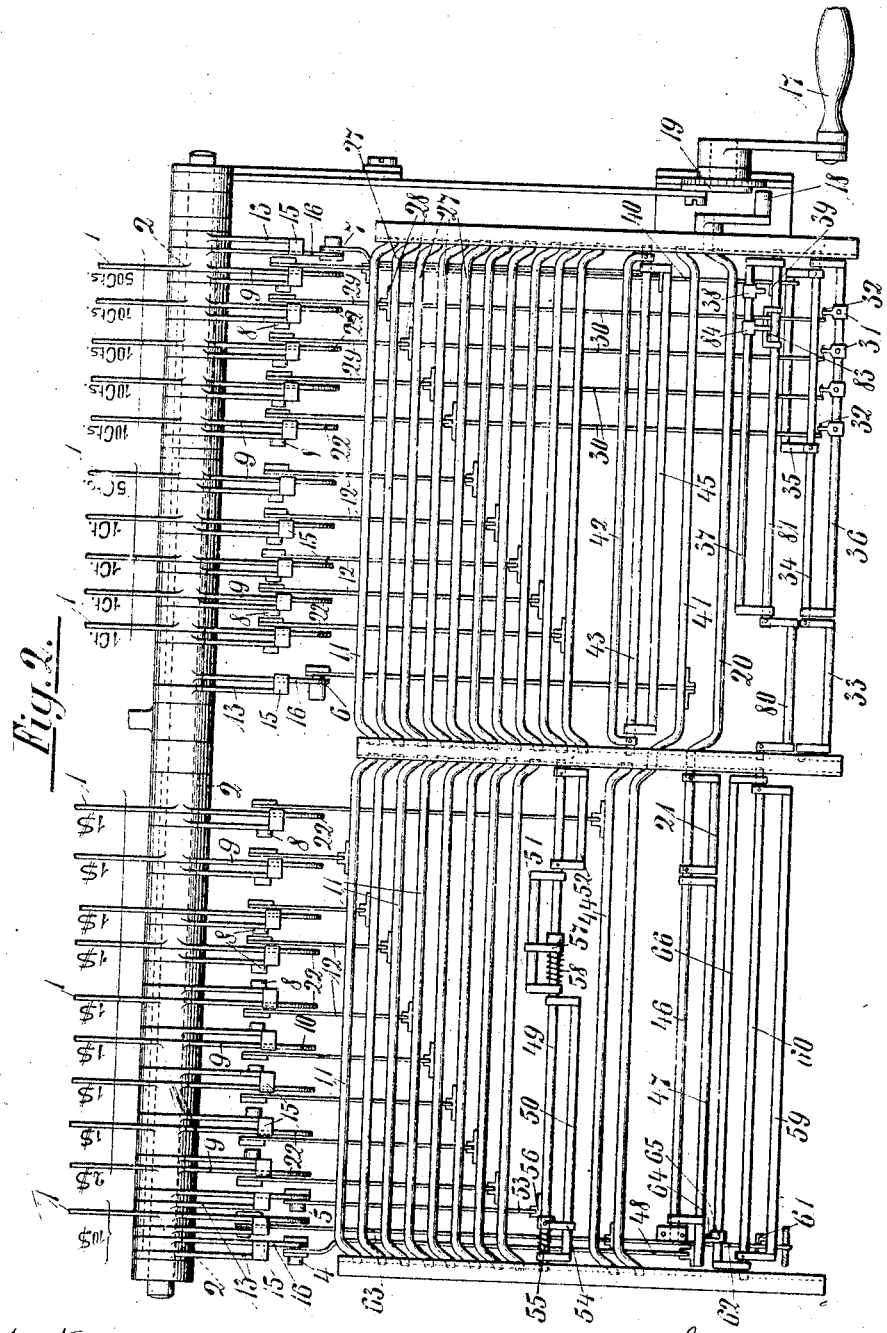

K. MAIER.
CHANGE MAKING MACHINE.
APPLICATION FILED NOV. 25, 1910.
1,115,850.
Patented Nov. 3, 1914.
6 SHEETS—SHEET 3.
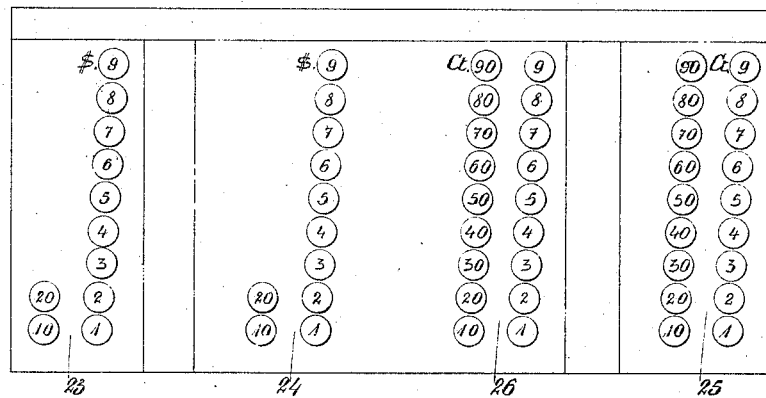
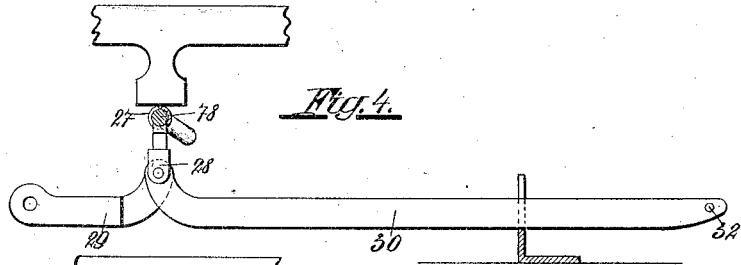
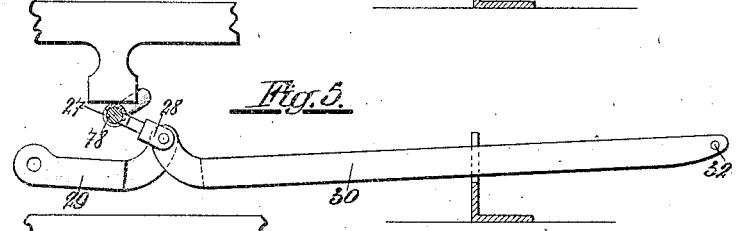
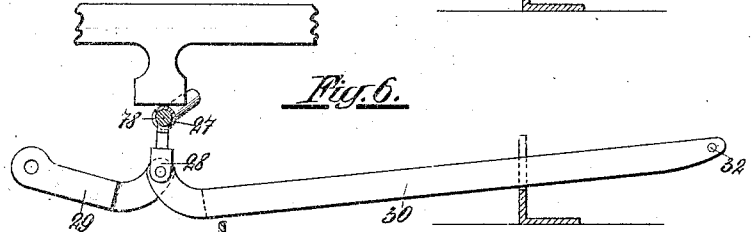
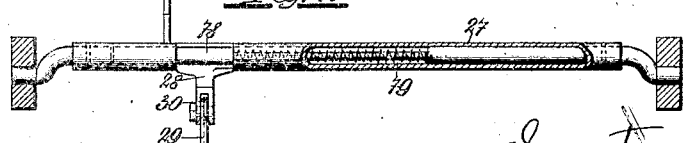

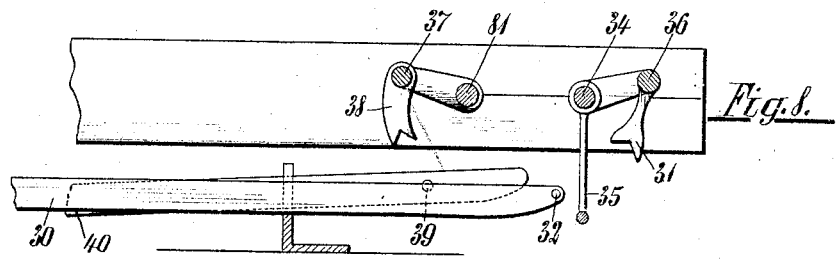
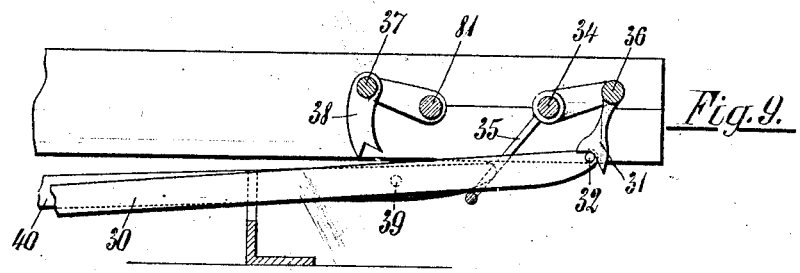
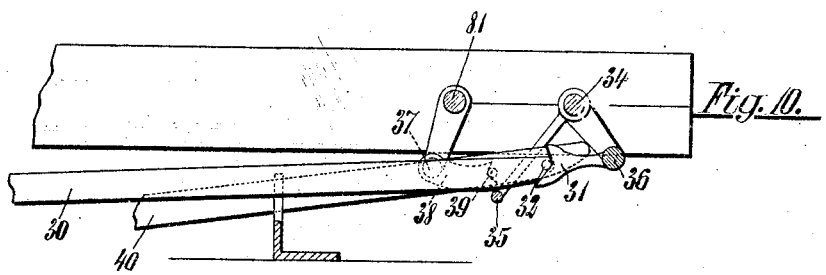
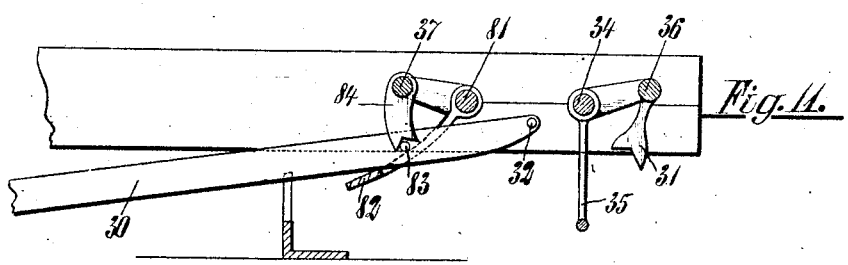

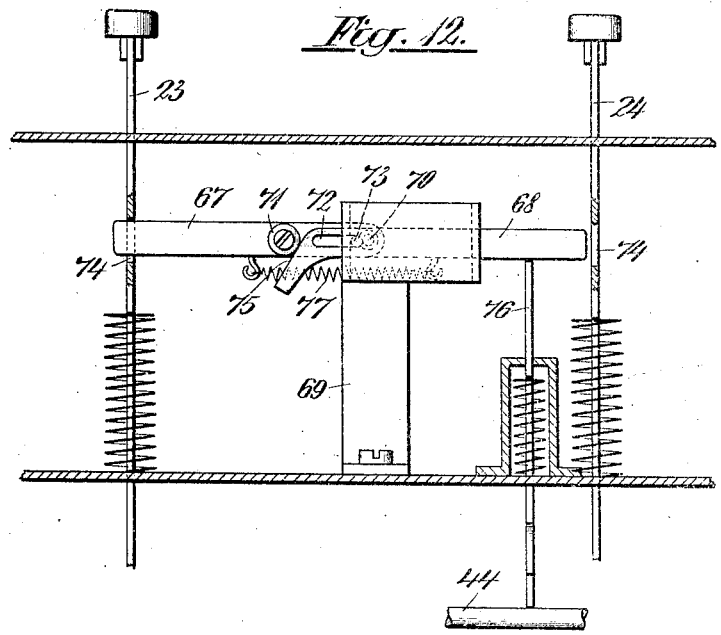

K. MAIER.
CHANGE MAKING MACHINE.
APPLICATION FILED NOV. 25, 1910.

1,115,850.

Patented Nov. 3, 1914.
6 SHEETS—SHEET 6.

UNITED STATES PATENT OFFICE.

KARL MAIER, OF STUTTGART, GERMANY, ASSIGNOR TO THE FIRM OF UNION SPECIAL-MASCHINENFABRIK G. M. B. H., OF STUTTGART, GERMANY.

CHANGE-MAKING MACHINE.

1,115,850.   Specification of Letters Patent.   Patented Nov. 3, 1914.

Application filed November 25, 1910.   Serial No. 594,043.

*To all whom it may concern:*

Be it known that I, KARL MAIER, a citizen of the German Empire, residing at Stuttgart, in the Kingdom of Wurttemberg, Empire of Germany, have invented certain new and useful Improvements in Change-Making Machines; and I do hereby declare the following to be a full, clear, and exact description of the invention, such as will enable others skilled in the art to which it appertains to make and use the same.

This invention relates to an improvement in cash registering and change giving machines in which, in addition to the automatic registering of the various amounts, any sum over paid is mechanically returned, so that the vender has nothing to do with the money. In this machine it is, however, necessary to adjust separate keys when, for instance the amount of the sale only consists of an amount in dollars, without cents (in the case of United States currency), the dollars must be uncoupled from the tens by means of separate keys when a unit adjustment follows. Further if the amount received is equal to the amount of the sale a separate depression of a given key is required, which then uncouples one dollar, as this key, which then uncouples one dollar, must always remain coupled for the cents. A separate catch frame for all the couplings is also provided, so that when one kind of money is not in use, all the ejectors relating to it must be uncoupled. Now in accordance with this invention the withdrawal of an already adjusted amount in the succeeding transfer to a subordinate kind of money, such as from dollars to cents, or tens to units is automatically effected. The ejectors are further arranged in groups on sleeves or sockets and directly but releasably connected with the operating shaft by means of a coupling, so that a separate catch bar frame is dispensed with, and only that group of ejectors operates, the bushing of which is coupled, while the other coin groups remain inoperatively stationary when no sale in them has taken place. The means for operating the coupling are also placed under the action of several keys, so that previous adjustments coöperate with a succeeding key, whereby it is possible to adjust various amounts with one key according to previous adjustments. By this arrangement the separate keys mentioned at the commencement, are dispensed with, whereby the working of the new machine is much more certain and simpler.

The invention will now be more particularly described in one form of construction as an example in connection with the accompanying drawings; in which—

Figure 1 is a side view of the entire machine with the end removed; Fig. 2, a plan view of the working parts, Fig. 3 shows the arrangement of the keys; Figs. 4–6 show in side view various positions of the yokes with the double joints; Fig. 7 is a sectional front view of the yoke; Figs. 8–11 show in various positions the method in which the working parts operate; Figs. 12 and 13 are sectional front views of the apparatus for throwing out of action the ejector when a dollar receipt equals a dollar sale; Fig. 14 is a longitudinal sectional view through the shaft 3 of Fig. 2.

The registering and change giving machine is provided in the ordinary way with a series of keys, the bars of which have projections, which on the depression of the keys encounter yokes and thereby rock these latter. These yokes have joints and couplings and are connected with the coin ejectors, so that on turning the handle the adjusted coins can be ejected. Now in accordance with this invention the ejectors 1 are loosely mounted on bushings 2 of the operating shaft 3 and divided into a number of groups, preferably four groups, one for each of the gold coins, the dollars, the fifty cents and the ten and five cent pieces and copper money. For each of these groups on the operating shaft a coupling 4, 5, 6 and 7 is provided which is thrown into action on the corresponding keys being operated. A coupling 8 is also provided for each ejector 1, which ejectors are all in the coupling position when the machine is not operated. Each ejector 1, as shown in Fig. 1, is further connected with a double-armed lever 9 which is loosely mounted on the bushing 2, one part of the lever being pivotally connected with the ejector 1, while the other end is formed as a slotted guide 10. In this slot 10 a roller which serves as coupling travels, which roller on the depression of the key is moved forward and backward by the yoke 11 and the link 12.

The coupling for the separate coin groups consists of a lever 13 which is firmly connected with the operating shaft 3 and also formed as a slotted guide 14 like the guide 10, but open in front and only up to half its extent. This lever 13 has also at its upper edge a bend 15, projection, cam or the like which rests on a lever 16 which is firmly mounted on the bushing 2.

The handle 17 for operating the operating shaft 3 has a safety mechanism, in order that the crank 17 cannot be rotated at will. This safety device substantially consists of a cam 18 which lies within reach of a stud 19 on the crank 17, so that this cannot be rotated. Now in order to release the stop 19, the cam 18 is provided with yokes 20 and 21, on which all the sale keys 24 and 26 press and thereby rock the cam 18 in such a way that it releases the stop 19 and the handle may be operated. If, for instance, by means of the handle 17 the operating shaft 3 be given an oscillation, only the lever 13 with its slotted guides 14 is lifted and as no keys are depressed, that is to say none of the group couplings 4—7 are coupled, this lifting of the lever has no further influence on the ejector. If on the other hand one of the couplings 4—7 be thrown into action, their coupling roller travels forward in the slotted guide of the lever 16 and thus reaches the slot 14 of the lever 13, so that when the machine is again operated by means of the handle 17, the lever 13 takes the coupling roller 4 or 5, 6 or 7 respectively with it and thus carries with it also all the levers 22 which are firmly mounted on the bushing 2 in question.

As already mentioned all the couplings 8 are coupled for the ejectors 1, so that all the levers 22 lift all the respective rollers 8 and operate the double levers 9 and thereby the ejectors 1, but of course only those ejectors which belong to the coupled group. Now one, several of or all the groups of couplings 4, 5, 6 or 7 may be simultaneously coupled and by depressing a number of keys the ejector couplings 8 uncoupled, so that when the handle is operated only those ejectors 1 operate, the groups of couplings 4—7 belonging to which firstly and then the ejector coupling 8 secondly, are coupled.

The series of keys consist of the separate sets of keys for the dollar receipts 23, dollar sales 24, cent receipts 25 and cent sales 26, the borrowing of an already adjusted amount taking place automatically in the then succeeding transfer to a subordinate kind of money such as from dollars to cents or tens to units. No separate keys are thus necessary, such as had hitherto to be operated. For this object the yokes which act in conjunction with the keys 23, 24, 25 and 26 are differently shaped and provided with suitable devices. Thus, for instance all the yokes 27 which operate the ten cent ejectors are provided with spring forks 28 which have links 29 and 30 on both sides, the links 29 being releasably connected with the ejectors 1 while the links 30 may be brought into connection with grippers 31 which, if necessary, push the links 29 and 30 and the latter are for this object provided with pins 32. The fork 28 turns on a pivot 78 which is mounted in the tubular yoke 27 and the fork 28, after it has been depressed by a key, is in spite of that again returned to the initial position by a spring 79.

The before mentioned grippers 31 only come into operation when the fifty cents sale key is depressed, which operates a yoke which rocks on a shaft 34 and thus operates a frame 35 which lifts the joint 30 for the four tens ejectors 1 and brings them within reach of the gripper 31, as the four tens couplings 8 are released, while the yokes 27 draw back the links 29 and 30 and rollers 8 and simultaneously displace the links in such a way that their pins 32 come to lie in the grippers 31. As of course the fifty cents sale key also encounters the yoke 20 and this releases the crank 17, after the crank 17 has been turned only the ejector of the fifty cents piece is operated, as only one coin group of fifty cents and four tens are coupled, the four tens are, however, as previously described uncoupled. If, however, in addition to the fifty cents sale key, for instance, the five cents key be depressed, the following action takes place: All the units sale keys press on the yokes 36 and 37 the yoke 36 again coupling the 4 tens by means of the gripper 31, while the yoke 37 throws out of action the link 40 of the 50 cents coupling by means of a gripper 38 and a pin 39, so that now 4 tens stand ready for ejecting. A yoke 41 is, however, operated when the five cents sale key is depressed, on which yoke all the cents sale keys press, the yoke 41 throwing into action the coupling 6. The five cents sale key also presses in known manner on the yokes 11 in such a way that they throw out of action the four cent units, so that of this group only the five cents ejector is still coupled. Thus when the handle is operated from the one coin group, four tens, and from the other coin group one five cents piece are ejected, that is to say forty-five cents which is correct.

A yoke 42 is also provided, which is firmly mounted on a shaft 43 of a yoke 44, see Fig. 2, and serves for uncoupling a one dollar ejector 1 when a key of the cents sale is depressed. On the same shaft 43 a yoke 45 is loosely mounted, which serves for coupling the coin group with the four tens and the one fifty cents piece.

As already mentioned two further groups of coins are provided, namely one for gold and for dollars. In order to cause these to operate in the correct way, separate and similar devices and yokes are provided equally as in the two other groups of coins. Thus a yoke 47 is provided, for instance, loosely mounted on the shaft 46, which yoke is coupled by means of a link 48 with the coupling 4 for the gold coin group.

Three yokes 50, 51 and 52 which form to a certain extent a shaft in three parts and serve for the following objects, are mounted, one firmly and the others loosely, on a shaft 49. The yoke 50 is loosely mounted on the shaft 49 and this is provided with a link or joint 53 which couples the dollars coin group. For this object a cam 54 is firmly arranged on the shaft 49, which cam is under the action of a spring 55 and rests on the yoke 50. The link 53 is also connected by a fork 56 with the shaft 49, so that on the operation of the yoke 50 the spring 55 presses down the cam 54, whereby the shaft 49 turns and thus displaces the link 53, that is to say the coupling 5 for the dollars coin group is coupled. The yoke 51 is also loosely mounted on the shaft 49, on which yoke a cam 57 also rests, the spring 58 of which is however, so strong that it overcomes the spring 55 when the yoke 51 is operated, whereby the cam 57 is lowered and then the shaft 49 rocks, that is to say the previously coupled dollar coin group is again uncoupled. The third yoke 52 which is firmly mounted on the shaft 49 has for its object, on the operation of the yoke 52, to again rock the shaft 49, whereby the dollar coin group is again coupled. The following examples will serve for the better comprehension of this:—

*First example—twenty dollars received, ten dollars sale.*—As soon as the $20 received key is depressed the coupling of the gold coin group is coupled by the yoke 47. Simultaneously, however, by the same key the yoke 50 is operated, which throws into action the dollar coin group. Now if the $10 sales key be depressed, it operates the yoke 51, which then, as already described, uncouples the coupling 5 and the dollars coin group, so that on operating the handle $10 in gold is ejected. A similar device as with the four tens is also provided with the gold ejector. This device consists of a yoke 59 which is firmly mounted on a shaft 60 and when operated lifts a frame 61. This frame 61 lifts a link 62 which is connected with the link 63, and as the link 62 has a pin 64, the latter comes within reach of a gripper 65 which is mounted on a yoke 66. Now if the yoke 66 loosely mounted on the shaft 60 be depressed, it draws back by means of its gripper 65 the links 62 and 63, that is to say the $10 ejector is uncoupled.

*Second example—twenty dollars received, 15 dollars sale.*—The $20 received key is depressed and it operates the two yokes 47 and 50, so that the coin group couplings 4 and 5 for gold and dollars are coupled. Now if the $10 sale key be depressed, this operates the yoke 51 and this uncouples the dollar group by means of a coupling 5, so that now $10 in gold stands ready to be ejected. The $10 sales key, however, also depresses the yoke 59 and this latter by means of its frame 61 lifts the link 62. All the one dollar sales keys press on the yokes 52 and 66. Now as soon as the five dollars sales key is depressed, the yoke 52 again throws into action the dollar coin group and the yoke 66 draws back the coupling 4 for the gold coin group. The five dollars sales key also presses in known manner with its projections on the yoke 11 and draws five dollars from the coupled dollar coin group, so that when the handle is turned $5 are ejected. If, for instance, 65 cents is the amount of the sale, the 60 cents sales key, like all the tens sales keys presses on a yoke 80 which operates a shaft 81, this latter lifting a frame 82, so that the link is also lifted, by a gripper 84 engaging behind its pin 83. Now when the five cents sales key is depressed it operates the yoke 37, so that only one ten is uncoupled by the gripper 84, and only three tens stand ready for ejection. The five sales key of the respective coin group has also, however, uncoupled four one cents, so that when a dollar is received and the sale is sixty-five cents, thirty-five cents are ejected. As soon as the dollar amount received is equal to the amount of dollar sale, for the correct operation of the machine, the always adjusted one dollar ejector must be uncoupled. For this object an equivalent dollar received key 23 and dollar sales key 24 are releasably connected with one another by bars 67 and 68, of which the bar 67 turns in a bearing 69 on a pivot 70 and carries a pressure roller 71, while the one bar 68 has a slot 72 into which a pin 73 of the bearing 69 extends and serves as a guide. Now the key bars 23 and 24 are provided with slots 74, one bar 67 always resting in the slot 74, while the bar 68 is only inserted in the slot 74 of the sales key 24 by means of the pressure roller 71 and the beveling 75 of the rod 68 when the receipts key 23 is depressed. On the sales key 24 being depressed, the rod 68 is carried with it and this presses on a bar 76 standing under the action of a spring, which bar then operates and uncouples the yoke 44 of the one dollar ejector. The bars 67 and 68 are also under the action of a spring 77.

I declare that what I claim is:—

1. A multiple coin deliverer comprising ejectors, key bars for coupling the ejectors, second key bars, means operated by the key bars for adjusting the second key bars, whereby the second key bars are set by the operation of the first key bars, said means comprising a yoke or frame, and a link operated thereby.

2. A multiple coin deliverer comprising a frame, coin pockets, ejectors for said pockets, a shaft for operating the ejectors, a separate crank on the shaft for each ejector, a fork for firmly connecting the cranks to the shaft, and springs for moving the shaft forward while the cranks return to their normal positions.

3. A multiple coin deliverer comprising a frame, coin pockets, ejectors for said pockets, a shaft for operating the ejectors, a separate crank on the shaft for each ejector, a fork for firmly connecting the cranks to the shaft, springs for moving the shaft forward while the cranks return to their normal positions, levers connected to the ejectors and loosely pivoted in groups on bushings, and means for separately connecting the levers to the bushings.

4. A multiple coin delivering apparatus comprising key bars, coin ejectors, couplings and a controlling member, said key bars being constructed to engage the couplings for the coin ejectors, and the controlling member, whereby a succeeding key under pressure engages not only the coupling of the coin ejector, but also the controlling member, the latter actuating a further ejecting coupling so that with one key several amounts are adjusted with respect to the preceding key adjustments.

5. A multiple coin delivering apparatus comprising key bars, coin ejectors, couplings and a controlling member, said key bars being constructed to engage the couplings for the coin ejectors, and the controlling member, whereby a succeeding key under pressure engages not only the coupling of the coin ejector, but also the controlling member, the latter actuating a further ejecting coupling so that with one key several amounts are adjusted with respect to the preceding key adjustments, said coin ejectors being loosely mounted on sleeves, said sleeves being rotatable on the operating shaft, and means for coupling said sleeves to move with said operating shaft.

6. A multiple coin delivering apparatus comprising key bars, coin ejectors, couplings and a controlling member, said key bars being constructed to engage the couplings for the coin ejectors, and the controlling member, whereby a succeeding key under pressure engages not only the coupling member of the coin ejector, but also the controlling means, the latter actuating a further ejecting coupling so that with one key several amounts are adjusted with respect to the preceding key adjustments, said coin ejectors being loosely mounted on sleeves, said sleeves being rotatable on the operating shaft, and means for coupling said sleeves to move with said operating shaft, each of said couplings comprising two slotted levers arranged one beside the other, coupling rolls moving in the slots, one lever being loosely mounted on the sleeve and connecting the ejecting lever with the ejector, the other lever being fixed on the sleeve and one of said slotted levers being rigidly connected with the operating shaft.

7. A multiple coin delivering apparatus comprising key bars, coin ejectors, couplings and a controlling member, said key bars being constructed to engage the couplings for the coin ejectors, and the controlling member, whereby a succeeding key under pressure engages not only the coupling member of the coin ejector, but also the controlling means, the latter actuating a further ejecting coupling so that with one key several amounts are adjusted with respect to the preceding key adjustments, said controlling member consisting of a crank shaft composed of several parts, each single crank of which has a fork for controlling the couplings, the loose cranks being spring operated, while the rigid cranks are adapted to move the shaft with the fork.

8. A multiple coin deliverer, comprising a frame, coin pockets, an ejector for each pocket, means for operating said ejectors, yokes for coupling said means to the ejectors, key bars for operating the yokes, means for normally locking the ejector operating means, and means operated by the yokes for releasing the ejector operating member.

9. A multiple coin deliverer, comprising a frame, coin pockets, an ejector for each pocket, a shaft for operating said ejectors, means for locking said shaft, a key operating mechanism for coupling each ejector to the shaft, means operated by the operation of one key for setting the keys for the succeeding operation, and means operated by each key mechanism for unlocking said shaft.

In testimony whereof I affix my signature, in presence of two witnesses.

KARL MAIER.

Witnesses:
HERMANN WIETHÜCHTER,
FRANZ GAUPP.